United States Patent [19]
Covert

[11] Patent Number: 5,169,283
[45] Date of Patent: Dec. 8, 1992

[54] BASKET DENESTER

[76] Inventor: William J. Covert, P.O. Box 365, Berlin, N.J. 08009

[21] Appl. No.: 749,857

[22] Filed: Aug. 26, 1991

[51] Int. Cl.⁵ .......................................... B65G 57/03
[52] U.S. Cl. .............................. 414/793.7; 414/796.9; 221/197; 221/215; 221/217; 221/219
[58] Field of Search .................... 414/793.7, 796.9; 221/197, 209, 210, 213, 214, 215, 216, 217, 218, 219, 220, 224, 225, 236, 289, 290

[56] References Cited

U.S. PATENT DOCUMENTS

| | | | |
|---|---|---|---|
| 3,718,267 | 2/1973 | Hiebert et al. | 414/793.7 X |
| 3,920,152 | 11/1975 | Shields | 221/236 |
| 3,921,826 | 11/1975 | Rice et al. | 414/793.7 |
| 4,508,483 | 4/1985 | Hessling et al. | 414/797.5 |
| 4,809,881 | 3/1989 | Becker | 221/224 |
| 4,867,626 | 9/1989 | Oberoi | 414/793.7 |

FOREIGN PATENT DOCUMENTS 2432460 4/1980 France .

*Primary Examiner*—Robert P. Olszewski
*Assistant Examiner*—Dean A. Reichard
*Attorney, Agent, or Firm*—Norman E. Lehrer

[57] ABSTRACT

A stack of baskets carrying frozen chickens or the like are mounted on a dolly which is wheeled into a denester having spaced apart vertical side walls. Each of the side walls carries a vertically moving conveyor having spaced hooks adapted to be moved inwardly to engage the baskets. As the conveyors move upwardly, the top basket is lifted from the top of the stack. As the conveyors continue to move, the next basket is lifted and this continues until all of the baskets are lifted off of the dolly and are spaced apart from each other. A horizontal conveyor is then interposed beneath the lowermost basket. The vertical conveyors are moved downwardly until the lowermost basket rests on the horizontal conveyor and the conveyor hooks are removed therefrom. This basket is then conveyed horizontally to make room for the next lowermost basket and the process continues until all of the baskets have been denested.

9 Claims, 5 Drawing Sheets

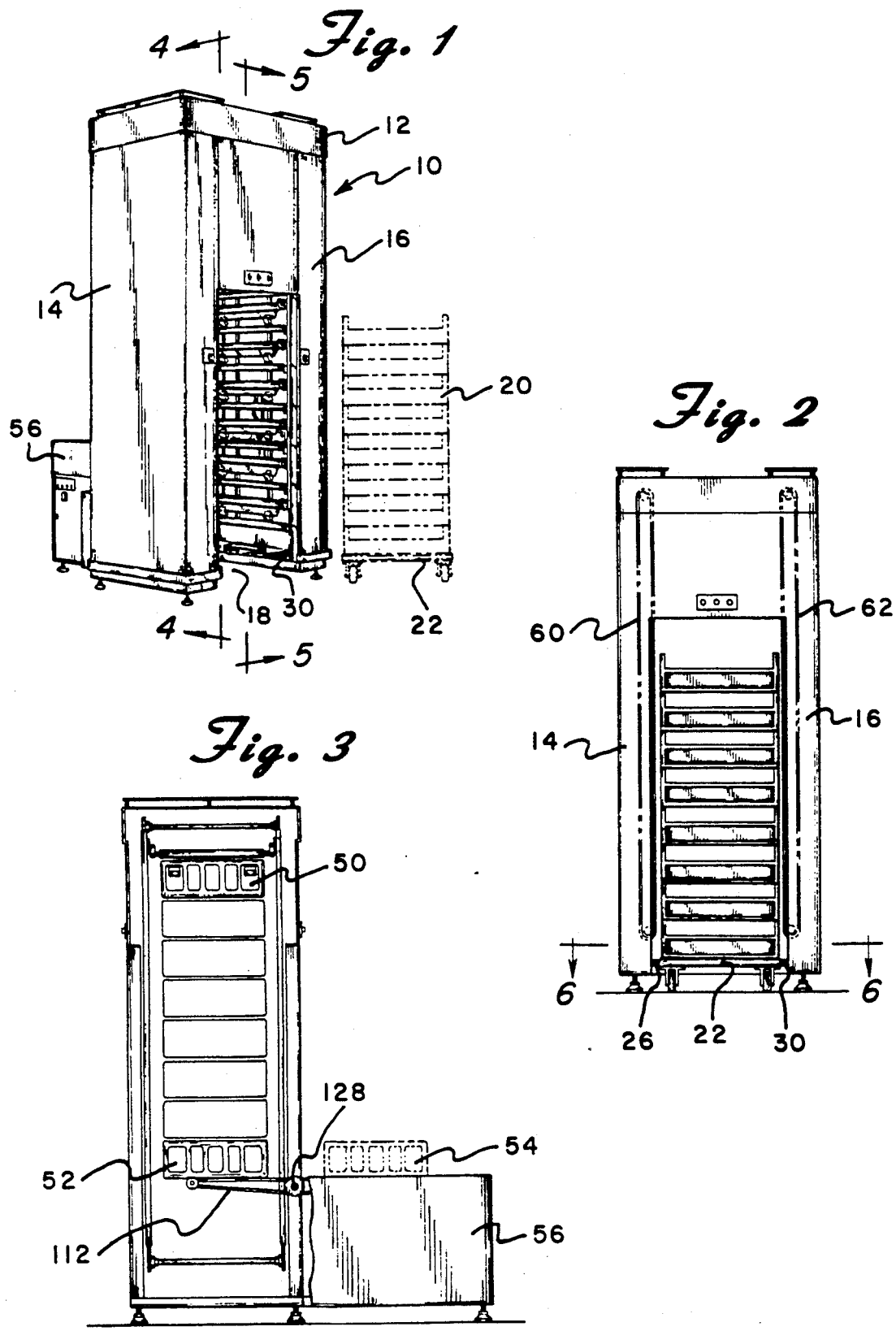

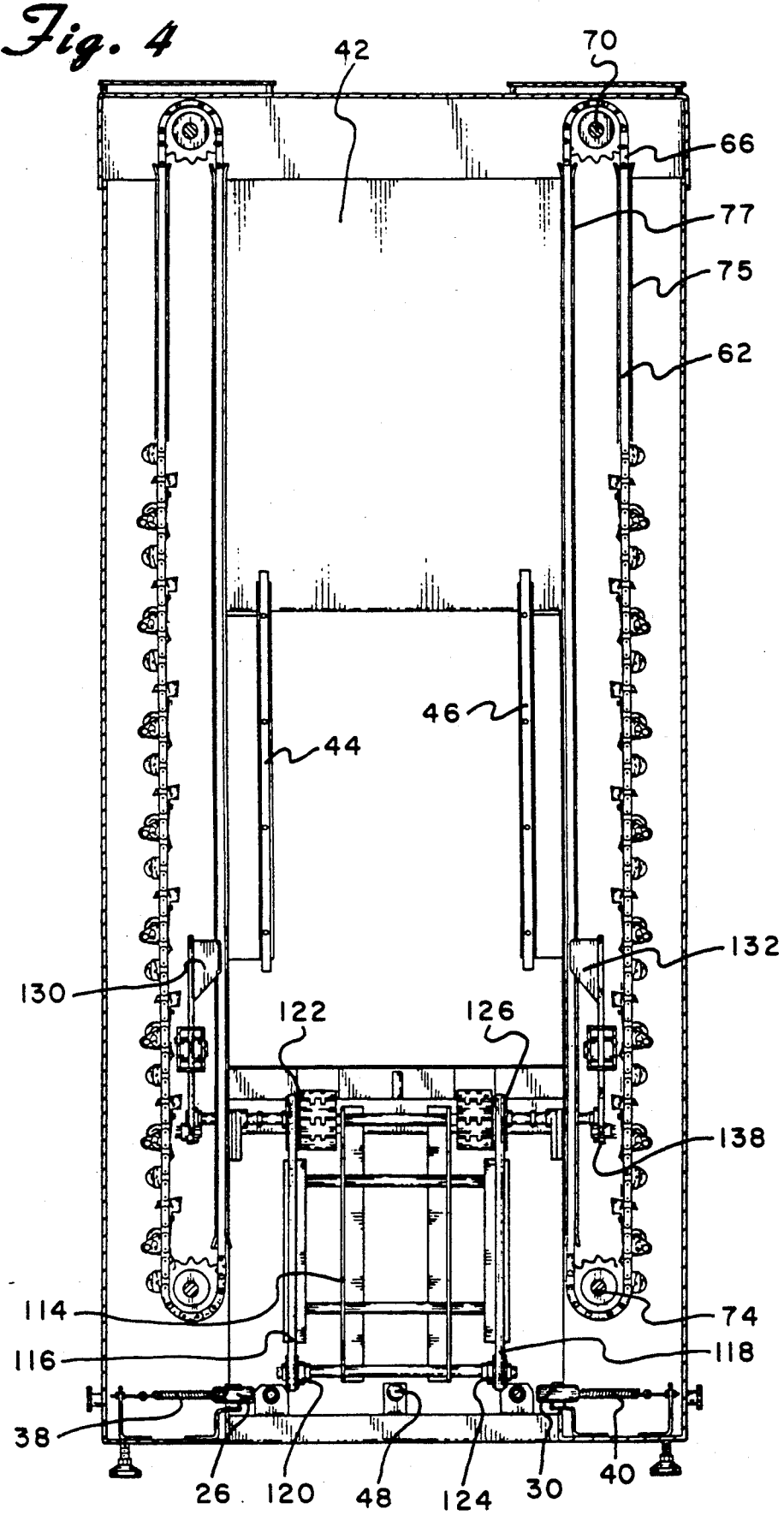

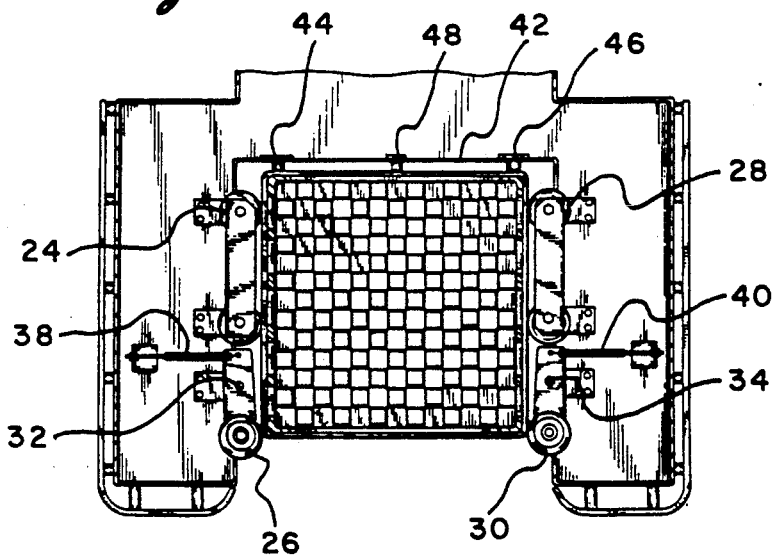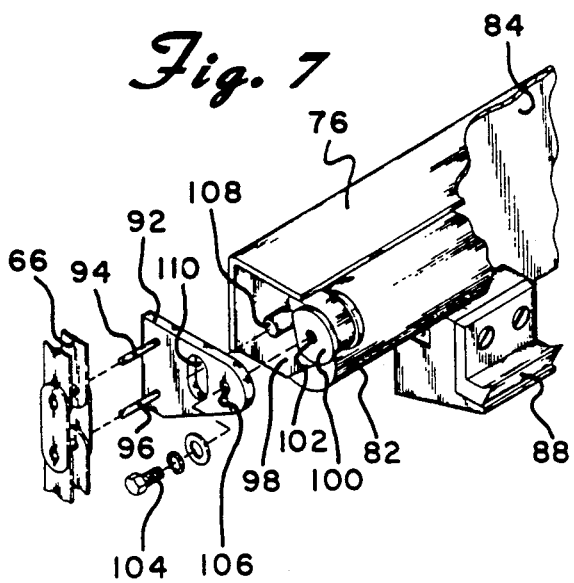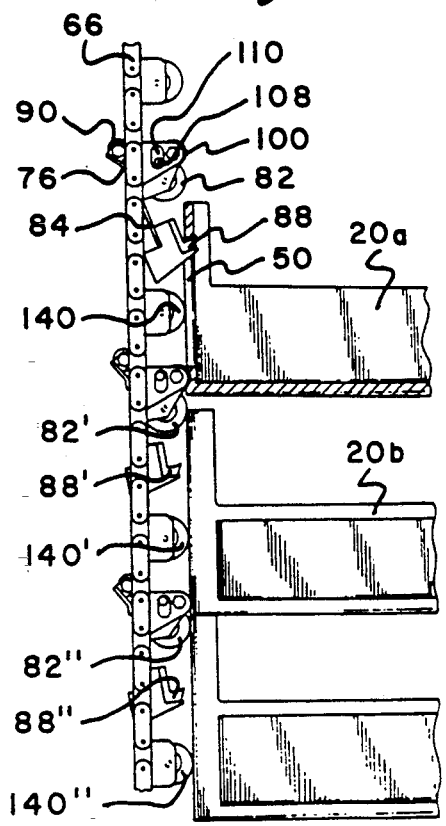

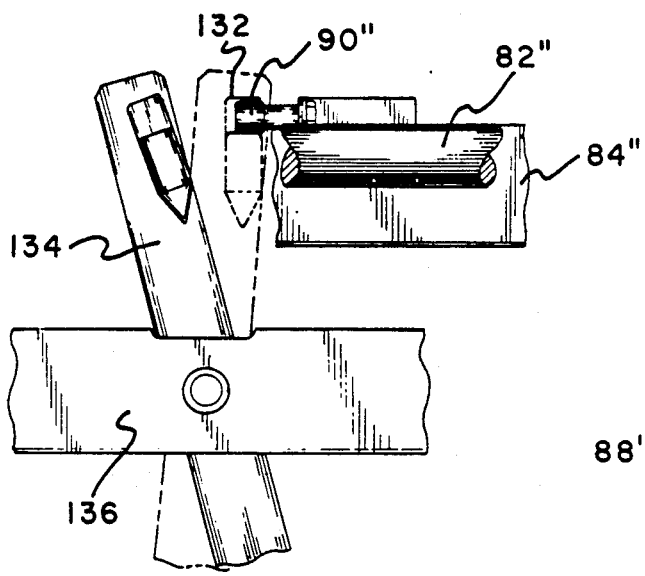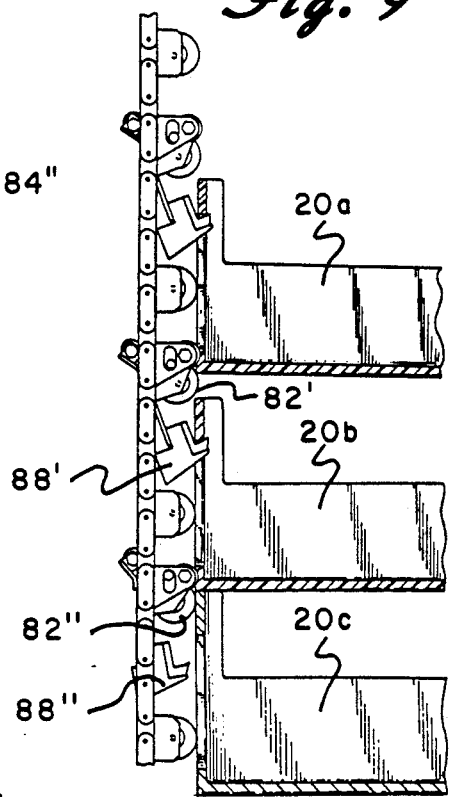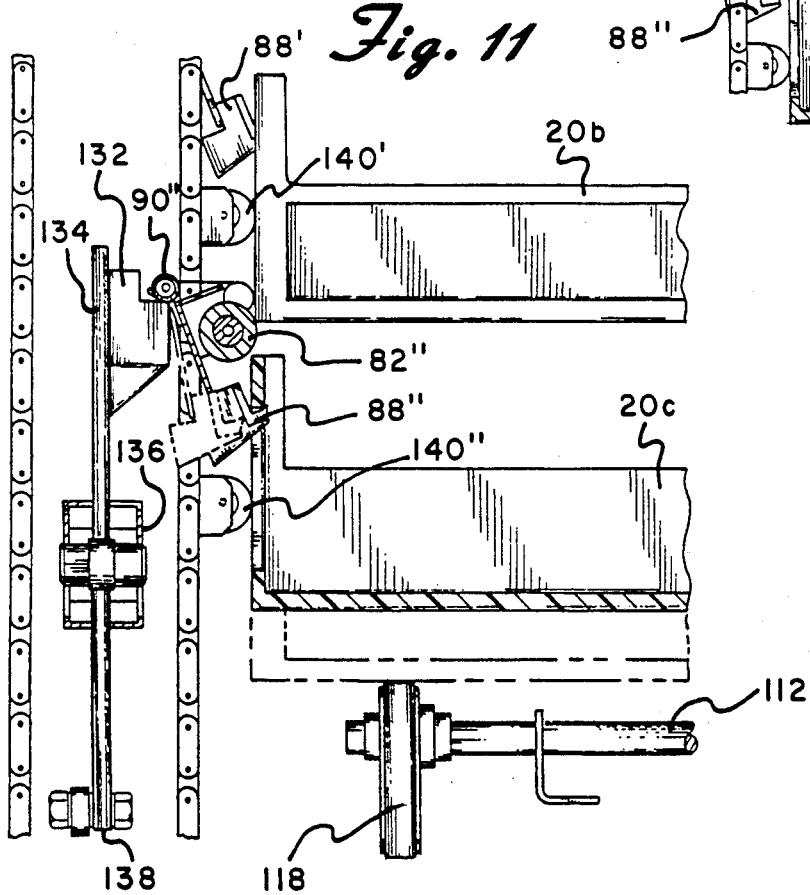

BASKET DENESTER

BACKGROUND OF THE INVENTION

The present invention is directed primarily toward a basket denester and, more particularly, toward an automatic system for automatically removing baskets, one at a time, from a stack of baskets and placing them on a horizontal conveyor. As will be seen, however, the invention can also be used to nest or stack baskets.

In a poultry packing plant, poultry parts are placed on small plastic trays and are then wrapped with a clear plastic film. These packages will ultimately be sent to a weighing station where they are weighed and a label showing the weight and price is applied. Prior to that time, however, a quantity of such trays are placed in shallow rectangularly shaped baskets for storage. These baskets which may weigh from 50 to 75 pounds each are stacked 8 high on a dolly so that the same can be wheeled around as needed.

These dollies with the baskets stacked thereon are stored in refrigerated or frozen warehouses for several hours or as much as several days. When it is desired to further process the packaged poultry, the baskets must be taken down one at a time from the top of the stack and placed on an operator table. Because of the height of the stack of baskets and the weight thereof, this has been a difficult and labor-intensive process which has resulted in many injuries to the workmen.

To Applicant's knowledge, no one has ever proposed an automated system for denesting baskets which have been vertically stacked on a movable dolly. Systems have been proposed for unstacking pallets or receptacles but none of these systems can be used to unstack such articles that may be mounted on a movable dolly. Examples of such prior art devices are shown in U.S. Pat. Nos. 3,920,152, 4,508,483 and 4,809,881.

Further, while the systems shown in the foregoing patents be useful for unstacking empty pallets or receptacles, they would not be useful for unstacking baskets such as used in the poultry industry which are filled with poultry parts. These prior art systems and substantially all other similar systems known to exist, unstack by lifting all but the lowermost item and then removing the lowermost item from the bottom. Thereafter, the entire stack is then set down and again all but the lowermost item is lifted. Lifting takes place by grippers or lifters which engage the next to the lowermost pallet or bin or the like and lift the entire stack thereabove. If the baskets were filled with poultry parts and stacked 8 high, the lifters would have to support approximately 500 pounds. It does not appear that the lifters of the prior art systems are capable of accomplishing this. Furthermore, it is doubtful that the lowermost poultry basket would be able to support all of this weight at the point where the lifters would engage the basket. There is, therefore, a need in the poultry industry for an automated system which can unstack these poultry baskets.

SUMMARY OF THE INVENTION

The present invention is designed to provide such an automated system. According to the invention, a stack of baskets carrying frozen chickens or the like are mounted on a dolly which is wheeled into a denester having spaced apart vertical side walls. Each of the side walls carries a vertically moving conveyor having spaced hooks adapted to be moved inwardly to engage the baskets. As the conveyors move upwardly, the top basket is lifted from the top of the stack. As the conveyors continue to move, the next basket is lifted and this continues until all of the baskets are lifted off of the dolly and are spaced apart from each other. A horizontal conveyor is then interposed beneath the lowermost basket. The vertical conveyors are moved downwardly until the lowermost basket rests on the horizontal conveyor and the conveyor hooks are removed therefrom. This basket is then conveyed horizontally to make room for the next lowermost basket and the process continues until all of the baskets have been denested.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a basket denester constructed in accordance with the principles of the present invention;

FIG. 2 is a front elevational view thereof showing a stack of baskets on a dolly which has been moved into the denester;

FIG. 3 is a somewhat schematic representation of the denester after the stack of baskets has been lifted off of the dolly and separated;

FIG. 4 is a cross-sectional view taken through the line 4—4 of FIG. 1;

FIG. 6 is a cross-sectional view taken through the line 6—6 of FIG. 2;

FIG. 7 is a partially exploded view showing the details of one of the lifting elements utilized with the invention;

FIG. 8 is a detailed view, partly in cross section, showing the manner in which each basket is lifted off of the stack;

FIG. 9 is a view similar to FIG. 8 showing further details of the lifting operation;

FIG. 10 is a detailed view of a cam mechanism utilized to disengage the basket lifters, and FIG. 11 is a detailed view showing the manner in which the lowermost basket is removed from the array and placed on a conveyor.

DETAILED DESCRIPTION OF THE PREFERRED EMBODIMENT

Figure 5:
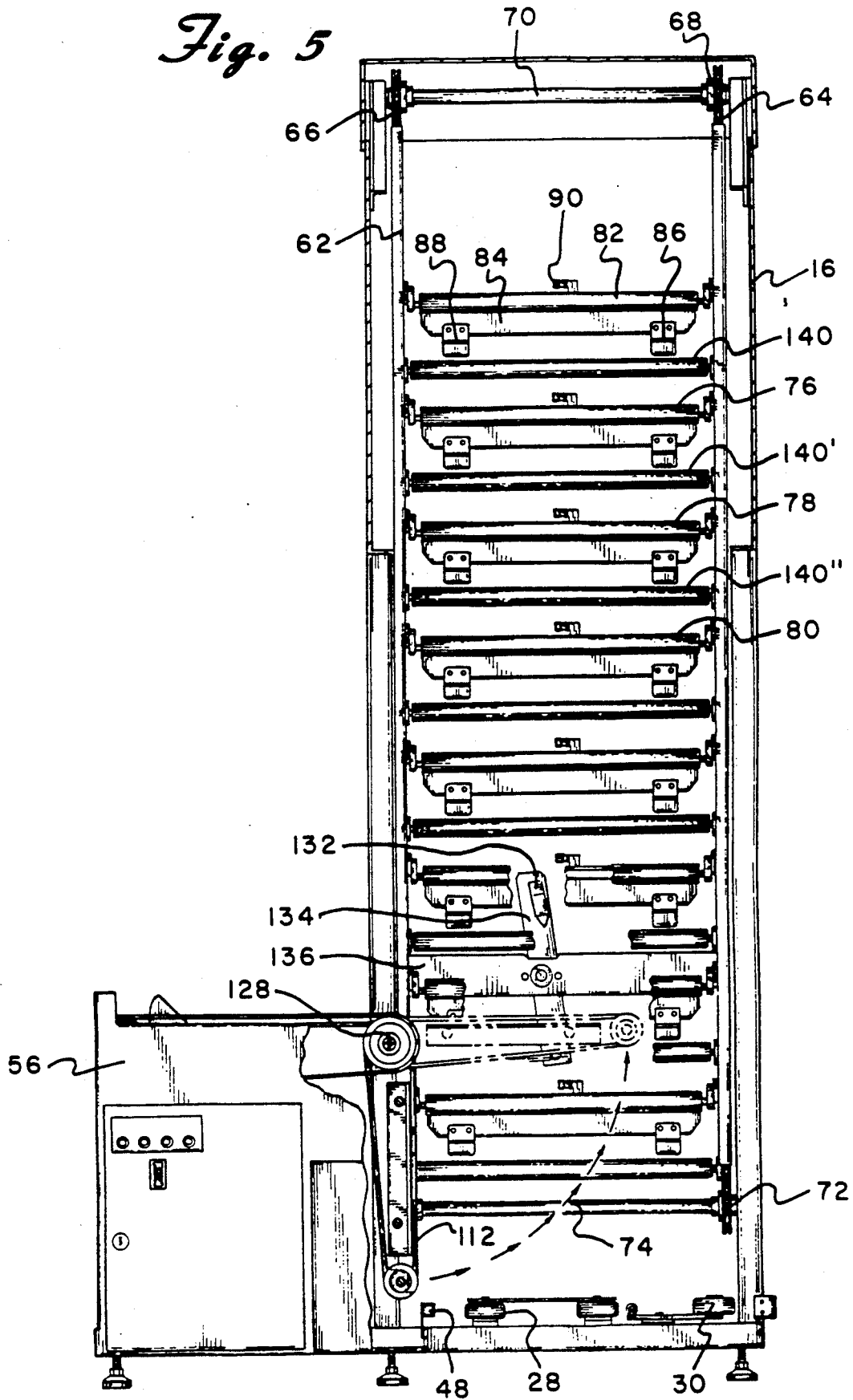
FIG. 5 is a cross-sectional view taken through the line 5—5 of FIG. 1.

Referring now to the drawings in detail wherein like reference numerals have been used throughout the various figures to designate like elements, there is shown in FIG. 1 a basket denester constructed in accordance with the principles of the present invention and designated generally as 10. The denester is comprised essentially of a frame or housing 12 which may be approximately 10 feet high and which includes a pair of spaced apart side walls 14 and 16 defining an opening 18 therebetween. A plurality of baskets 20 vertically stacked or nested on top of each other and carried by a movable dolly 22 are adapted to be rolled into the opening 18 as shown in FIG. 2.

As shown most clearly in FIG. 6, guide rollers 24 and 26 are mounted on the left wall 14 and facing inwardly and similar guide rollers 28 and 30 mounted on the right wall 16 and also facing inwardly engage the dolly 22 as it is moved into the opening 18 and insure that the dolly with the stack of baskets 20 thereon is properly aligned in the center of the housing 12. Guide rollers 26 and 30 are pivotally mounted at pivot points 32 and 34, respectively, and are biased inwardly through the use of springs 38 and 40. The limited movement of these rollers 26 and 30 held to guide the dolly 22 as it begins to enter the opening 18.

Mounted on the back wall 42 of the housing 12 are a pair of elongated and vertically extending stop members 44 and 46. These stop members engage the forward edges of the baskets 20 as the stack of baskets is moved into the opening 18 in order to help maintain the vertical alignment of the baskets. Forward movement of the dolly 22 into the opening within the housing 12 is stopped by the stop member 48.

The baskets themselves are of conventional type used in the poultry industry and are 29 inches wide, 26 inches long and 9 inches high. The baskets are made of a rigid plastic material and are adapted to hold approximately 70 pounds of poultry products. As shown in FIG. 3, the sides of the baskets have openings such as shown at 50, 52 and 54 therein which can be used by workmen as handles to carry the baskets. It will be readily understood that the baskets thus described, while conventional, are described by way of example only. It is possible to use other types of baskets. It is also possible to re-dimension the entire denester unit so as to accommodate other shapes and sizes of baskets. Furthermore, while the word "basket" is being used to identify the elements 20 which are nested or stacked on the dolly 22, these could be referred to as "trays" or "racks" or the like.

As pointed out above, the primary purpose for the denester 10 of the present invention is to remove the baskets, one at a time, from the stack of baskets and place them on a work table such as shown at 56. Alternatively, table 56 may be part of a horizontal conveyor which is used to convey the denested baskets to a more remote work station. In any case, denesting takes place utilizing a first on, first off procedure. This is accomplished primarily through the use of vertical conveyors 60 and 62 arranged on the inside of the walls 14 and 16, respectively.

Vertical conveyors 60 and 62 are substantially identical to each other. Accordingly, only one vertical conveyor, 62, will be described in detail. It will be understood, however, that the detailed description of vertical conveyor 62 applies equally to vertical conveyor 60.

As shown most clearly in FIGS. 4 and 5, conveyor 62 is comprised of a pair of spaced apart, endless chains 64 and 66. Chain 64 which is located adjacent the front of the housing 12 extends substantially the entire height of the housing and is guided at its top by sprocket wheel 68 mounted on axle 70 which extends substantially the length of the wall 16. The bottom of the chain 64 is guided by the sprocket wheel 72 carried by the axle 74. Chain 66 is similarly guided by sprocket wheels mounted at the top and bottom thereof on the back end of axles 70 and 74. Vertically extending chain guides 75 and 77 help to maintain the chains in substantially straight vertical orientation.

Extending between the chains 64 and 66 and supported thereby in vertically spaced relationship are a plurality of lifting mechanisms such as shown at 76, 78 and 80. In the preferred embodiment of the invention, there are eight such lifting mechanisms. However, it is possible to construct a denester in accordance with the invention with more or less lifting mechanisms. As will be seen, however, there must be at least one lifting mechanism for each basket in the stack of baskets desired to be denested.

As shown most clearly in FIGS. 5 and 7, each lifting mechanism is comprised essentially of an elongated roller 82, an elongated substantially L-shaped bracket 84 and a pair of normally inwardly facing hooks 86 and 88 carried by the lower end of the bracket 84. A cam follower 90 is also secured to the bracket 84 adjacent the upper portion thereof and extends slightly upwardly and rearwardly.

Each of the lifting assemblies such as assembly 76 is pivotally mounted to the chains 64 and 66 so that the entire lifting assembly thus described can rotate as a unit through a limited arc. As shown in FIG. 7, this is accomplished by a tab member 92 secured to the chain 66 through pins 94 and 96. An end cap 98 secured to the end of L-bracket 84 includes a forward extension 100 having an opening 102 therein. A bolt or similar pivot pin 104 passes through opening 106 in the tab 92 and into the opening 102 in the extension 100 to function as a pivot point. A stop or limit pin 108 extends outwardly from the end plate 98 into an elongated slot 110 formed in the tab member 92. This allows for only limited pivotal movement of the lifting assembly 76.

The denester 10 also includes a swing conveyor 112. Swing conveyor 112 is comprised of a frame 114 and a pair of spaced apart conveyor belts 116 and 118 which travel around pulleys 120 and 122 and 124 and 126, respectively.

Swing conveyor 112 is pivoted through axle 128 to the work table 56. As shown most clearly in FIG. 5, the swing conveyor 112 is movable between a substantially vertical position as shown in the solid lines and a substantially upward horizontal position as shown in phantom. The purpose for the swing conveyor 112 will become more apparent hereinafter.

Associated with each of the vertical conveyors 60 and 62 and located intermediate the two vertical chains comprising each conveyor is a cam member such as shown at 130 and 132. Again, since cam members 130 and 132 are constructed and operated in substantially the identical manner, only cam member 132 will be described in detail; it being understood that cam member 130 is constructed and functions in substantially the same manner.

Cam member 132 is mounted on a carrier bar 134 which is pivoted adjacent its central point thereof to a horizontally extending brace 136. Through an appropriate linkage 138, the carrier bar 134 can be moved from an inoperative position such as shown in FIG. 5 and in solid lines in FIG. 10 wherein it is tilted to one side to a substantially vertical position as shown in phantom in FIG. 10. When the swing conveyor 112 is in its lowered and inoperative position, the carrier bar 134 is in its tilted and inoperative position and when the swing conveyor 112 is in its horizontal and operative position, the carrier bar 134 is also in its operative position which, of course, places the cam member 132 in its operative position.

The denester 10 operates in the following manner. Preliminarily, the swing conveyor 112 is lowered into its inoperative position. Vertical conveyor 60 is rotated clockwise and vertical conveyor 62 is rotated counterclockwise so that all of the lifting mechanisms are in their fully inoperative positions as shown in FIG. 4. Guided by guide rollers 24, 26, 28 and 30, a dolly 22 with a stack of baskets 20 thereon is then wheeled into the opening 18 until the dolly is stopped by stop member 48 and the baskets abut the vertically extending stop members 44 and 46.

After the stack of baskets 20 is in position, the vertical conveyors are activated. Vertical conveyor 60 is rotated counterclockwise while vertical conveyor 62 is rotated clockwise. As this occurs, the lifting mechanisms such as mechanisms 76, 78 and 80 begin to present themselves at the lowermost basket and move upwardly in sequence past each basket in the stack. As shown most clearly in FIGS. 8 and 9, as the lifting mechanisms move upwardly, the rollers such as shown at 82, 82' and 82" engage the side walls of the baskets. Engagement of these rollers by the side walls pivots the hooks 88, 88' and 88" outwardly so that they cannot engage the baskets but merely freely pass by them as they move upwardly. The rollers 82, 82' and 82" along with the intermediately located rollers 140, 140' and 140" also carried by the chain conveyors work to maintain the baskets in proper vertical orientation.

Due either to gravity or springs (not shown) each of the lifting mechanisms are biased in such a way that the roller 82 and hooks 88 are biased inwardly. As explained above, they are normally forced outwardly by the rollers riding on the side faces of the baskets. However, as shown in FIG. 8, when the roller 82 reaches the position above the top of the uppermost basket 20a, roller 82 is no longer being forced outwardly and moves inwardly. Simultaneously, hook 88 moves inwardly and enters the opening 50 in the side of the basket 20a. It will be understood that a simultaneous operation is occurring with the other hook 86 associated with the hook 88 and with the hooks on the opposite side of the basket. As the vertical conveyors continue to move upwardly, the basket 20a is lifted upwardly from the top of the stack.

As shown in FIG. 9, as the vertical conveyors continue to move upwardly, a larger space appears between the uppermost basket 20a and the next basket 20b in the stack. Eventually, the second roller 82' which is rolling up the side of the basket 20b enters this space thereby allowing hooks 88' to enter the openings in the sides of the baskets. As the vertical conveyors continue to move upwardly, the second basket 20b is also lifted off of the stack. Baskets 20a and 20b continue to move upwardly and are spaced apart from each other by a fixed vertical amount as shown in FIGS. 3 and 9.

As the baskets 20a and 20b move upwardly, a space is similarly created between baskets 20b and 20c and eventually roller 82" enters this space, thereby allowing hook 88" to engage and lift the basket 20c. This process continues until all of the baskets are lifted from the stack 20 and are in the position shown in FIG. 3 where they are in the same vertical arrangement but each being spaced slightly from the next basket in the array.

The baskets are removed from this array of vertically spaced baskets in the following manner. Once the baskets are in the position shown in FIG. 3, the swing conveyor 112 is swung into its horizontal operative position. Simultaneously, the cams 130 and 132 are pivoted into their vertical and operative positions. The dolly 22 can then be removed from the opening 18 and the vertical conveyors are activated in their reverse direction.

As the vertical conveyors begin to lower the baskets, the lowermost basket such as basket 20c, as shown in FIG. 11, begins to approach the horizontally positioned swing conveyor 112. As it approaches, cam follower 90", associated with one of the lifting mechanisms, engages the cam member 132 as shown in FIGS. 10 and 11. As the conveyor continues to move downwardly, the cam follower 90' riding on the cam 132 moves inwardly, thereby forcing the hook 88' which had been engaging the basket 20c outwardly into the position shown in phantom in FIG. 11. Since this occurs simultaneously with each of the hooks supporting basket 20c, the basket drops from the vertical conveyor onto the horizontally positioned swing conveyor 112. Belts 116 and 118 of the swing conveyor 112 then move the basket 20c onto the table 56. The vertical conveyors then continue to move downwardly sequentially placing each lowermost basket onto the swing conveyor until all of the baskets have been denested.

While the invention has been described as a denester and a detailed description has been set forth as to the manner in which the baskets are denested or unstacked, it should be readily apparent to those skilled in the art that the same apparatus could be used for stacking or nesting baskets onto a dolly. This would be accomplished by feeding the baskets one at a time from the work table 56 onto the swing conveyor 112 and into the housing where the baskets will be lifted into a separated stack as shown in FIG. 3. At that point, the swing conveyor is then lowered so as to be out of the way and the vertical conveyors lower the separated stack of baskets onto a dolly which has been wheeled into place at the bottom of the housing. As each basket is placed on the dolly or on the basket below, it functions as a cam for the rollers 82, 82', 82", etc. to release the hooks 88 from the lifting assembly associated therewith.

The present invention may be embodied in other specific forms without departing from the spirit or essential attributes thereof and accordingly reference should be made to the appended claims rather than to the foregoing specification as indicating the scope of the invention.

I claim:

1. A basket denester for removing baskets one at a time from a vertical stack of baskets comprising:
    a housing into which a stack of baskets mounted on a dolly can be moved;
    said housing including spaced apart side walls located on either side of said baskets;
    each of said side walls including a vertically moving conveyor carrying a plurality of vertically spaced apart hooks adapted to extend inwardly to selectively engage said baskets through openings in the sides thereof;
    means for moving said conveyors upwardly, and
    means for causing said hooks to selectively move inwardly as said conveyors are moved upwardly to sequentially lift the uppermost basket from said stack until said entire stack of baskets has been lifted, said hooks being vertically spaced from each other such that said lifted baskets are vertically spaced from each other.

2. The invention as claimed in claim 1 further including a horizontal conveyor and means for positioning said horizontal conveyor beneath the lowermost basket of said stack of baskets after said baskets have been lifted.

3. The invention as claimed in claim 1 wherein said hooks are biased inwardly.

4. The invention as claimed in claim 3 further including a follower roller secured to each of said hooks and movable therewith, each follower roller being adapted to roll over the sides of said baskets and to maintain its respective hook outwardly and out of engagement with said baskets when said roller engages the side of a basket.

5. The invention as claimed in claim 4 wherein each follower roller is adapted to move inwardly as it rises above the height of the uppermost stacked basket, the hook associated with the inwardly moving roller also moving inwardly to engage the basket associated therewith.

6. A basket nester/denester for adding or removing baskets one at a time to or from a vertical stack of baskets comprising:
- a housing adapted to contain a stack of baskets mounted on a dolly;
- said housing including spaced apart side walls;
- each of said side walls including a vertically moving conveyor carrying a plurality of vertically spaced apart inwardly biased hooks adapted to extend inwardly to selectively engage said baskets through openings in the sides thereof;
- means for moving said conveyors upwardly and downwardly;
- means for causing said hooks to selectively move inwardly as said conveyors are moved upwardly to sequentially lift the uppermost basket from a stack or to selectively move outwardly as said conveyors are moved downwardly to release a basket when the same is placed on top of another basket already on a stack, said hooks being vertically spaced from each other, and
- a follower roller secured to each of said hooks and movable therewith, each follower roller being adapted to roll over the sides of said baskets and to maintain its respective hook outwardly and out of engagement with said baskets when said roller engages the side of a basket.

7. The invention as claimed in claim 6 wherein each follower roller is adapted to move inwardly as it rises above the height of the uppermost stacked basket, the hook associated with the inwardly moving roller also moving inwardly to engage the basket associated therewith.

8. The invention as claimed in claim 6 wherein each follower roller is adapted to move outwardly as it engages the side of a basket, the hook associated with the outwardly moving roller also moving outwardly to disengage the basket associated therewith.

9. A method of unstacking a vertical stack of baskets to be fed one at a time to a horizontal table comprising:
- sequentially lifting each basket one at a time from the top of said stack,
- spacially separating each basket from the one below it as each basket is lifted,
- interposing a horizontal conveyor beneath the lowermost basket after said entire stack has been lifted,
- lowering said baskets until said lowermost basket is resting on said horizontal conveyor,
- moving said basket resting on said conveyor horizontally to make room for the next lowermost basket and repeating said lowering and moving steps until all of said baskets have been unstacked.

* * * * *